May 3, 1932.    J. HARRIS    1,856,554
INDUCTION ELECTRICITY METER
Original Filed April 19, 1929
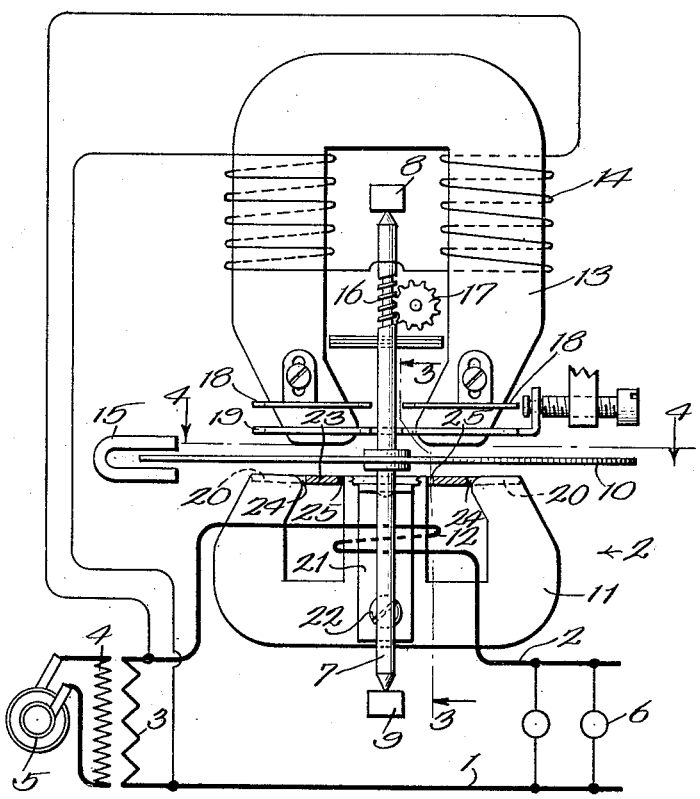
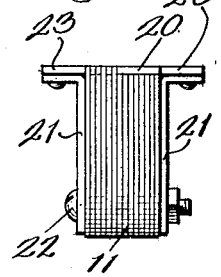
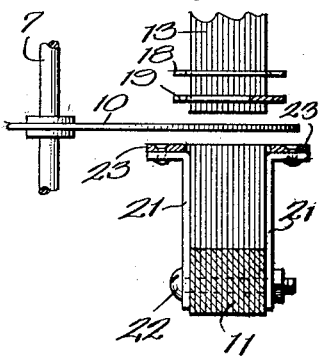
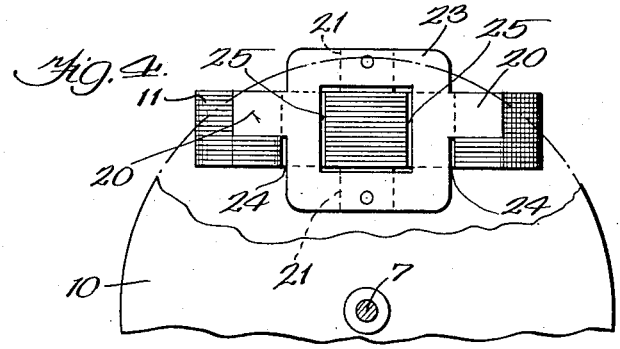
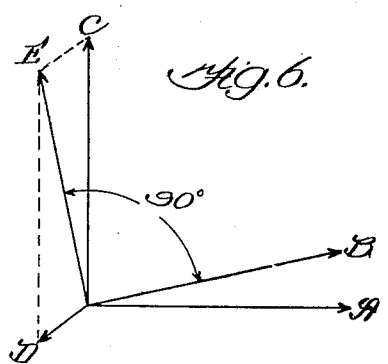
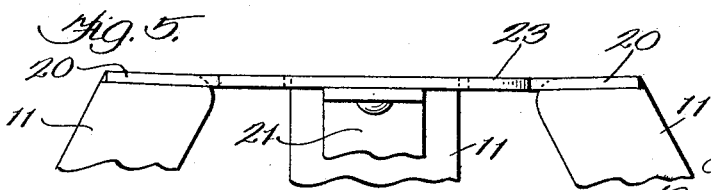
Inventor:
Jesse Harris Patented May 3, 1932

1,856,554

UNITED STATES PATENT OFFICE

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

INDUCTION ELECTRICITY METER

Application filed April 19, 1929, Serial No. 356,485. Renewed September 23, 1931.

My invention relates to induction electricity meters and has two general objects in view, namely, to improve the registration curve of the meter, and particularly that portion that extends beyond what is called the normal or full load of the meter, modern practice frequently calling for the registration of loads 200 and 300% above the normal or full load capacity; and to eliminate or reduce errors on loads of fractional power factor.

An induction electricity meter is usually inclusive of an armature in the form of a metallic disc that turns within an air gap and of a driving torque producing magnet system having current and pressure windings. Such armature, or a similar one in fixed relation thereto, turns within a field of flux produced by a permanent damping magnet. A suitable integrating device is driven by the armature.

According to well known laws, the driving torque of such a meter is proportional to the first power of the driving flux and the meter speed should be proportional to this torque. Error arises due to the fact that the torque producing flux also effects a drag upon the armature that is proportional to the second power of this flux. Unless corrective means are employed, the meter will, consequently, get slower and slower proportionately upon loads increasing beyond the normal or calibrated full load rating of the meter, the corresponding portion of the registration curve consequently having a constantly increasing error.

In such a meter the fluxes due to its torque producing current and pressure windings should be displaced a quarter phase on unity power factor a displacement which should vary as the power factor of the circuit varies. Quadrature relation of these fluxes on unity power factor has hitherto been effected at the temperature in the meter factory. Other temperatures encountered by the meter in service so affect the electric and magnetic characteristics of the meter as to disturb the proper relation of its driving fluxes and introduce error in the meter speeds.

Permeability of a body, the reciprocal of its reluctivity, is the relative ease with which magnetic lines of force may be produced therein. In carrying out my invention, I provide a core element of the torque producing magnet system with two portions that are included in parallel in the magnetic circuit of this core element and cause one of these flux paths to have less permeability than the other by introducing a greater gap or gaps in its part of the magnetic circuit. As the meter desirably has one core for the pressure winding and another core for the current winding, I provide the core of the current winding with the two parallel portions of differing permeability. I also form a core portion with an opening to constitute this core portion a closed conductor. I place this core portion in induced or secondary relation with a polar portion of the core.

In the preferred embodiment of the invention both objects are realized by the provision and proper location of a single element, in the form of a magnetic shunt between portions of unlike polarity of the core of the current winding. This shunt may be made of iron of such purity as to insure a high temperature coefficient of resistance, such as Norway iron. This shunt is preferably intimately associated with that half or other selected portion of the current core that is more distant from the axis of rotation of the rotating conductor or armature of the meter so that this flux path has greater permeability than the other. In a meter thus arranged, approximate proportionality of the inductive action and magnetizing force of the meter field windings are also maintained down to the lower limits of measurement. The overload droop in the registration curve is also overcome, to a large extent, owing to the relative location of the flux paths of differing permeability whereby a compensating shifting of the center of flux density cutting the disc, away from the center of the armature, is effected during overload conditions. The aforesaid magnetic shunt has a hollow or ringlike portion which is placed in induced or secondary relation with a core pole which is preferably surrounded thereby. This magnetic shunt or core portion that is thus in induced relation to the core serves to correct or reduce errors due to temperature variations occurring while loads of fractional power factors are being measured.

I will explain my invention more fully by reference to the accompanying drawings in which Fig. 1 is a view diagrammatically illustrating the preferred form of meter and a circuit with which it may be associated; Fig. 2 is a view of a portion of the meter looking in the direction of arrow 2, Fig. 1; Fig. 3 is a sectional view on line 3—3 of Fig. 1; Fig. 4 is a sectional view on line 4—4 of Fig. 1; Fig. 5 is a side view of a part of the meter, on a larger scale; and Fig. 6 is a vector diagram.

I have illustrated transmission mains 1, 2 supplied from a suitable source of current, which may be the secondary 3 whose primary 4 is shown as being supplied from an alternating current generating dynamo 5. The load illustrated is in the form of incandescent electric lamps 6, but may be both or either inductive and non-inductive. The energy consumed by the load is measured by a watt hour meter, which is inclusive of an upright spindle or shaft 7 suitably held in bearings 8 and 9. A closed rotating metallic conductor, preferably a horizontal aluminum armature disc 10, is carried by the spindle on which the disc is rigidly secured. This disc is turned proportionately to the energy consumed by the load by a magnet system that is inclusive of a current or series magnet and a pressure or shunt magnet. The current magnet is inclusive of an E-shaped laminated core 11 whose middle leg is wound by a coil 12 serially included in the main 2. This core and its poles are upon the lower side of the armature. The pressure core 13 and its poles are upon the upper side of the armature. The pressure magnet is inclusive of a U shaped laminated iron core 13 whose legs are surrounded by the coils 14 which are connected in series in the same bridge between the distributing mains 1 and 2. The speed of the armature of the meter is checked by the permanent magnet 15 which embraces the peripheral portion of the disc with which it is in inductive relation. The meter parts illustrated and described constitute a meter motor whose armature 10 and spindle 7 turn proportionately to the wattage in a manner well known to those familiar with the art.

A worm 16 is provided upon the spindle 7 and is in mesh with a pinion 17 that is in driving relation with the counting train of the meter, as is well understood without the necessity of further illustration.

Quadrature relation on unity power factor of the magnetic fields due to the current and pressure windings is effected by means of the closed conductors 18, 18 which surround the ends of the pressure core 13 and are adjustable for calibration along these core ends to regulate the secondary relation of these conductors with the pressure winding 14. The conductors 18, 18 may be in the nature of non-magnetic metallic plates with holes therethrough through which the ends of the core 13 are passed. A non-magnetic metallic plate 19 has two holes formed therethrough through which the ends of core 13 are also passed, to provide closed conductors that compensate for friction. This plate is adjustable for calibration crosswise of the limbs of the core 13.

The half or other selected portion of the laminæ of the E shaped core 11 that is preferably more remote from the armature disc is partially shunted by a magnetic shunt 20 which is preferably received at its ends within recesses in the faces of the outer poles of said core. This magnetic shunt desirably has its ends tightly pressed into engagement with said pole faces, to which end it is held in place by the brackets 21 of brass or other non-magnetic metal to which it is riveted and which are held against the sides of the core by the bolts 22. The outer half of the core 11 is thus caused to have less reluctance and more permeability than the other half of this core. The magnetic shunt 20 has an an intermediate ringlike portion 23 which is coaxial with and desirably surrounds the middle pole of the core 11. Gaps 24 intervene between the outer legs or poles of this core and the shunt 20, these gaps being at the inner half of the core so that the permeability of this inner core half is less than that of the outer core half. Air gaps 25 desirably intervene between the entire middle leg of core 11 and the shunt 20.

The core portion 20 serves to shunt the magnetic flux of the core 11 proper in increasing amounts as the current in the work circuit is increased, the rate of shunting decreasing as the load is increased due to the saturation characteristics of the shunt. I so place the shunt 20 with respect to the poles of the series core 11 that the flux due to core 11 and threading the disc not only increases as the load on the meter is increased, due to the magnetization curve of said shunt, but a leverage increase is also exerted due to the shifting of the center of the flux path of said core away from the center of the disc, the saturation of the shunt increasing upon increase of load. I thus compensate for the too rapid saturation of the shunt 20 which is preferably composed of Norway iron or steel with similar permeability and temperature characteristics. Thus the overload droop in the registration curve is overcome to a large extent. The proportionality of the inductive action and magnetizing force of the meter field windings are not disturbed from normal full load down to the lower limits of measurement. A double effect is thus produced, tending respectively to increase the speed of the meter on the over loads, and to overcome the effect of the increased drag exerted on the armature disc when cutting the increasing flux in the series core.

Quadrature relation between the current and pressure fluxes is established on unity power factor at the temperature which happens to obtain where the meter is made and calibrated. Changes in temperature hitherto caused changes in the electric and magnetic characteristics of materials in the meter and of such extent as to throw these fluxes out of their proper relation at other temperatures.

Referring to Fig. 6, if a unity power factor condition of the circuit to be measured is assumed, the impressed E. M. F. may be indicated at A, the lagged series flux at B, the reactance due to the windings and magnetic circuit of the potential core at C and the vector due to the lag coils 18 at D. The resultant E is adjusted to be in quadrature with the lagged series flux B at unity power factor.

Upon a rise in temperature the resultant E would become at a less angle to the impressed E.M.F., due to several causes, such as the increased resistance of the windings, increased resistance of the lag coils 18, losses in the iron, etc. Leaving out the effect of an uncompensated permanent magnet drag, the meter would run slow on a rise in temperature and fast on a drop in temperature, on lagging fractional power factor circuits, if there be no compensation for the altered series flux B. The iron ring 23 in my shunt 20 forms a secondary circuit or lag coil for the series core 11. The flux of this secondary 23 would approach the vector A upon rise in temperature. The ring being made of iron and having a high temperature coefficient of resistance, its activity or power to change is great compared with the lag coils or secondaries 18, of very low temperature coefficient of resistance, on the potential electro-magnet, these coils 18 being usually made of Muntz metal, an alloy of zinc and copper. I thus maintain the angle of 90 degrees between the two current and pressure fluxes upon changes in temperature at unity power factor and the proper relation for fractional power factors.

The ringlike series core shunt 20—23 of my invention has additional advantages. It adds greatly to the efficiency of the meter, that is the meter can be operated with less loss. It helps to bridge the air gap between the poles of the potential core on the opposite side of the armature disc and thus lowers the reluctance of the potential magnetic circuit. An increased flow of the flux, cutting the armature disc results, causing a greater torque. Because of the increased flux, a higher reactance obtains with lower losses. The iron ring structure is located at the air gap and on the opposite side of the disc from the pole tips of the core of the potential electro-magnet. In this location its permeability and proximity to the potential pole tips have the effect of increasing the amount of flux which passes from the potential poles through the disc. The increase in such flux is useful torque producing flux. The increase in permeability of the voltage magnet flux path due to the iron ring also necessitates less magnetizing current in the windings in order to produce the total amount of flux-creating back E. M. F. in the potential winding. Resultant effects from the above mentioned factors are that less $I^2R$ loss occurs in the potential coil. Also less IR drop is consumed in it, which causes its flux to be more nearly in quadrature relation to the applied voltage than without the iron ring. This in turn means that less current is required in the phasing plate which secures the exact quadrature relation desired and this reduced current in the phasing plate again is the cause of a reduction in $I^2R$ loss in this element.

The resultant or over-all effect of the iron ring, in addition to its other corrective advantages, is, therefore, an increase in the torque producing power of the voltage electro-magnet with a reduction in its losses. The increased reactance gives a greater lag angle, requiring less energy in the lag coils 18 to produce the necessary quadrature relation between the current and potential fluxes. The magnetic ring also aids in confining the flux to a definite path or region and lessens stray field errors.

While I prefer to employ an E-shaped current or series core whose middle leg has its axis surrounded by the current winding and magnetic shunt and whose side legs or poles are partially bridged by the magnetic shunt to have a part of the current core flux shunted more than the balance of this flux, I do not wish to be thus limited.

Changes may be made without departing from the spirit of the invention.

Having thus described my invention, I claim:

1. A rotating induction electricity meter including a driving torque producing magnet system having a current core including two portions in parallel in the magnetic circuit of the core, a magnetic shunt bridging unlike poles of the core, and formations embodied in said shunt effective upon sufficient overload to cause progressive saturation of the shunt into the region of one of said core portions, the core portion into the region of which the shunt is progressively saturated being nearer the axis of the rotating element of the meter than the other core portion.

2. A rotating induction electricity meter including a driving torque producing magnet system having a current core including two portions in parallel in the magnetic circuit thereof, one of the core portions having a plurality of air gaps in series formation, said last mentioned core portion being nearer the axis of the rotating element of the meter than the other core portion.

3. A rotating induction electricity meter including a driving torque producing magnet system having a current core including two portions in parallel in the magnetic circuit thereof, a magnetic shunt bridging parts of unlike polarity of the core and providing an air gap in one of the core portions, said core portion having the air gap being nearer the axis of the rotating element of the meter than the other core portion.

4. A rotating induction electricity meter including a driving torque producing magnet system having current and pressure windings, the current winding having a magnetizable core element including two portions in parallel in the magnetic circuit of this core element, a magnetic shunt bridging portions of unlike polarity of one of these core portions and serving to increase the permeability of this core portion relatively to the other with the core portion of greater permeability located farther from the axis of the rotating element of the meter than the other core portion, a lagging closed conductor in induced relation to the pressure flux, said magnetic shunt having a portion constituting a lagging closed conductor in induced relation to the current flux.

5. A rotating induction electricity meter including a driving torque producing magnet system having current and pressure windings, the current winding having a magnetizable core element including two portions in parallel in the magnetic circuit of this core element, a magnetic shunt bridging portions of unlike polarity of one of these core portions and serving to increase the permeability of this core portion relatively to the other with the core portion of greater permeability located farther from the axis of the rotating element of the meter than the other core portion, a lagging closed conductor in induced relation to the pressure flux, said magnetic shunt having a portion constituting a lagging closed conductor in induced relation to the current flux, said shunt and the lagging closed conductor that is in induced relation to the pressure flux having respectively high and low temperature coefficients of resistance.

6. A rotating induction electricity meter including a driving torque producing magnet system having current and pressure windings, the current winding having a magnetizable core element including two portions in parallel in the magnetic circuit of this core element, and a magnetic shunt bridging portions of unlike polarity of one of these core portions and serving to increase the permeability of this core portion relatively to the other, the core portion of greater permeability being farther from the axis of rotation of the rotating element of the meter than the other core portion, said magnetic shunt having a portion constituting a lagging closed conductor in induced relation to the current flux.

7. A rotating induction electricity meter including a driving torque producing magnet system having current and pressure windings, the current winding having an E-shaped magnetizable core element having its middle leg surrounded by the current winding and including two portions in parallel in the magnetic circuit of this core element, one of these core portions having a gap formation that renders this core portion less permeable than the other, the core portion of greater permeability being located farther from the axis of the rotating element of the meter than the other core portion, a lagging closed conductor in induced relation to the pressure flux, and a magnetic shunt between portions of unlike polarity of the current core and having a portion constituting a lagging closed conductor in induced relation to the current flux.

8. An induction watthour meter comprising a voltage electromagnet, a current electromagnet having a plurality of pole pieces, a rotatable disc mounted in an air gap traversed by magnetic flux produced by said current and voltage electromagnets and a shunt plate of magnetic material for said current electromagnet; said shunt plate being mounted in fixed relation to the current electromagnet and substantially parallel to the plane of the disc and on the opposite side of said disc from the voltage electromagnet so that it acts in a substantial degree to modify the flux from the voltage electromagnet which traverses the disc; the edge of said shunt plate being exposed to one current electromagnet pole at more than one side of said pole and separated therefrom by a gap so that a predominating portion of the current electromagnet flux which is shunted is constrained to enter the shunt plate through its edge; said shunt plate being shaped and proportioned to provide means whereby its various portions approach saturation in progressive relation as the load current is increased to modify the magnitude and distribution of the resultant current and potential flux through the disc and provide a substantial compensating effect for the heavy-load errors in the registration of said meter.

9. The meter of claim 8 wherein said shunt plate is shaped and positioned asymmetrically with respect to a plane perpendicular to the disc and passing through the center of the current electromagnet.

In witness whereof, I hereunto subscribe my name.

JESSE HARRIS.